US007379943B2

(12) United States Patent
Paulus et al.

(10) Patent No.: US 7,379,943 B2
(45) Date of Patent: May 27, 2008

(54) METHOD AND SYSTEM FOR BIDIRECTIONALLY DATA BINDING A CONTROL OF A TEMPLATE

(75) Inventors: Polita Paulus, Kirkland, WA (US); Bradley Millington, Bellevue, WA (US); Nikhil Kothari, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 11/046,011

(22) Filed: Jan. 28, 2005

(65) Prior Publication Data

US 2006/0173863 A1 Aug. 3, 2006

(51) Int. Cl.
*G06F 17/30* (2006.01)
(52) U.S. Cl. ...................... 707/101; 719/331
(58) Field of Classification Search ............... None
See application file for complete search history.

(56) References Cited

U.S. PATENT DOCUMENTS

| 6,631,497 | B1 * | 10/2003 | Jamshidi et al. ............. 715/514 |
| 6,792,607 | B1 * | 9/2004 | Burd et al. .................. 719/316 |
| 7,080,366 | B2 * | 7/2006 | Kramskoy et al. .......... 717/148 |

\* cited by examiner

*Primary Examiner*—Jean M. Corrielus
*Assistant Examiner*—Noosha Arjomandi
(74) *Attorney, Agent, or Firm*—Merchant & Gould P.C.; Ryan T. Grace

(57) ABSTRACT

A control is bound to a data item that provides a data binding context. Controls inside the template of a data bound control have properties which are bound to fields of the data item via a bidirectional data binding process. Bidirectional data binding allows a page developer to specify that a field in a data item is inserted into a control property value when a page is rendered on a client. Bidirectional data binding also allows the data-bound control to automatically and codelessly extract an arbitrary control property value associated with a data item field in a template when the page is posted back to the server.

20 Claims, 6 Drawing Sheets

*Fig. 4*

METHOD AND SYSTEM FOR BIDIRECTIONALLY DATA BINDING A CONTROL OF A TEMPLATE

BACKGROUND

Certain technologies and frameworks for developing web applications, such as an active server page (e.g., ASP.NET), use the notion of controls that may be dropped on a design surface to quickly develop the outlines of a web application. The controls are further customized through code written by a developer, setting of properties, etc. One class of controls is data-bound controls which are bound to a data source and allow access to a data item, such as in a database. The data item offered by the data bound control constitutes a data binding context for the controls within the data bound control to refer to when setting their properties.

Data binding may occur at the request of a page programmer or the data-bound control may initiate the data binding process. Whenever an event occurs on the data-bound control, such as paging to the next visible set of data records, data binding the control to new data refreshes the rendering of the control. Similarly, when a user requests a data manipulation operation such as updating a record, the program needs to retrieve the new data out of the text entry controls on the page, execute the necessary calls to the data store to update the record, and then execute a call to the data binding process to refresh the rendering of the control.

A data-bound control commonly offers a data item as the data binding context for the controls inside the parent (data-bound) control. If the data-bound control determines the layout of the controls displaying data, the data-bound control can populate the control properties with data and retrieve new data values from the control properties when new values are posted back to the server. However, if the data-bound control supports user-defined templates which dictate the selection and layout of the controls within the data-bound control, the data-bound control cannot easily retrieve the values of the control properties associated with a data item field. For example, a table control may receive data from a row of a database to display to the client. A textbox within the table control may set its text property to the values of a column in the data row using a data binding statement. If the text within the textbox is changed by the client to indicate updated data, the new text must be retrieved and associated with the data row field. However, if the table control does not know which textbox contains the new value, the value cannot be retrieved and associated with a data field automatically. Instead, user code is required to retrieve the new value.

Some of the limitations of template control property data binding are addressed by one-way automatic data binding. One-way automatic data binding binds the properties of controls inside a template to data from the parent control's data binding context. However, it is common for the server control to retrieve the data from the control property at a later time. For instance, controls are commonly used for updating data in addition to displaying data. A user may modify a control property value after the page renders to the client. The page programmer is required to manually write code to retrieve control property values to update data store field values. This process is laborious and prone to error. In addition, specific knowledge of the control tree within the parent control and the template is required which may result in failure if the control tree changes across page revisions.

SUMMARY

The present disclosure is directed to a method and system for data binding a property of a control inside a template of a parent control offering a data binding context. The control property is bound to a data field via a bidirectional data binding process. The template allows a page developer to design a unique control layout that befits the application and data schema. The control does not require built-in data binding logic to take advantage of the automatic two-way data binding feature; neither does the page developer need to manually write extraction code to retrieve values from the controls inside the template. The bidirectional data binding process is operable with any control property value that may be set. Bidirectional data binding allows a page developer to specify that a field of a data item is inserted into a control property value of a bindable template when a page is rendered to a client. Bidirectional data binding also allows the page developer to extract a modified value from the bindable template without writing code, for instance, when the value is updated and the page is posted back to the web server.

The bidirectional data bind process may be initiated when a user client requests a page from a web server. The control instantiates a template that contains controls whose values are bound to data fields of the data item. The control then data binds the template contents with field value data from a data item. The populated item template is displayed when the page is rendered on the client.

After a post back, the parent control retrieves the values of the control properties associated with each data item field. An example of a case where the parent control retrieves the values of control properties associated with the data item is the updatable data form. The user may select an edit button from a user interface at the client to modify the control property values in the data store. A post back occurs to the web server containing a directive to display the control such that the data may be edited. The control instantiates the corresponding edit item template. The control property values in the edit item template are bound to the corresponding field values in the data source. The edit item template is shown on the page rendered to the client. Current and/or default values of the control properties are displayed as editable data on the rendered edit item template. The user may then edit any of the editable control property values of the edit item template and then click an update button.

In this example, another post back to the web server is triggered in response to the update request. The control extracts the modified values from the edit item template and receives a new value dictionary. The control may raise an update event with the dictionary of values such that the page programmer may modify the data. The control then provides the new value dictionary to the data store. The dictionary includes the field names and the corresponding modified control property values. The data source then stores the new values for the data items.

Another example of a control that takes advantage of bidirectional data binding is a state storage control. Controls commonly need to keep track of their current state across post backs. A control can add a hidden field to its control tree and bind the hidden field's text property to a data item containing control state using bidirectional data binding. When the page is posted back to the server, the control can use bidirectional data binding to automatically retrieve the stored state from the hidden field's text property and rehydrate the control with state from the original post. In this example of an application of the bidirectional data binding technology, the user does not change anything on the page when the page is posted to the server. Instead the controls inside the template serve as storage for state data that is needed on post back.

Because user-defined templates are a common element of data bound controls, it is desirable to allow a data bound control developer to define a template such that it allows for bidirectional data binding. An IBindableTemplate can be specified by a control developer by adding an attribute onto an ITemplate. This straightforward method for declaring a template that supports bidirectional data binding enables all control developers to take advantage of bidirectional data binding in a uniform way. All controls inside a bindable template can participate in bidirectional data binding without any changes to the existing control. Furthermore, page developers can specify a property on a control inside a template to be bidirectionally-bound using simple and familiar declarative syntax.

In accordance with one aspect of the invention, a template is associated with a parent control that offers a binding context. The template is instantiated. The template includes a control property value associated with the control. The control property value is bound to a field of a data item associated with a data source. The data item is exposed by the parent control. The template is rendered on a page for a client. The rendered template includes the control property value corresponding to the field of the data item. The modified control property value is automatically and codelessly extracted from the template.

BRIEF DESCRIPTION OF THE DRAWINGS

FIG. 4 illustrates several screen shots illustrating a user interface for data binding a control of a template, in accordance with at least one feature of the present invention.

DETAILED DESCRIPTION OF THE PREFERRED EMBODIMENT

The present disclosure is directed to a method and system for data binding a control of a template and retrieving values from control properties inside a template. The control is bound to a data item that provides a data binding context. Controls inside the template of a data bound control have properties which are bound to fields of the data item via a bidirectional data binding process. Bidirectional data binding allows a page developer to specify that a field in a data item is inserted into a control property value when a page is rendered on a client. Bidirectional data binding also allows the data-bound control to automatically and codelessly extract an arbitrary control property value associated with a data item field in a template, for instance, as one might do when data is modified on the client and posted back to a server.

Illustrative Operating Environment

Figure 1:
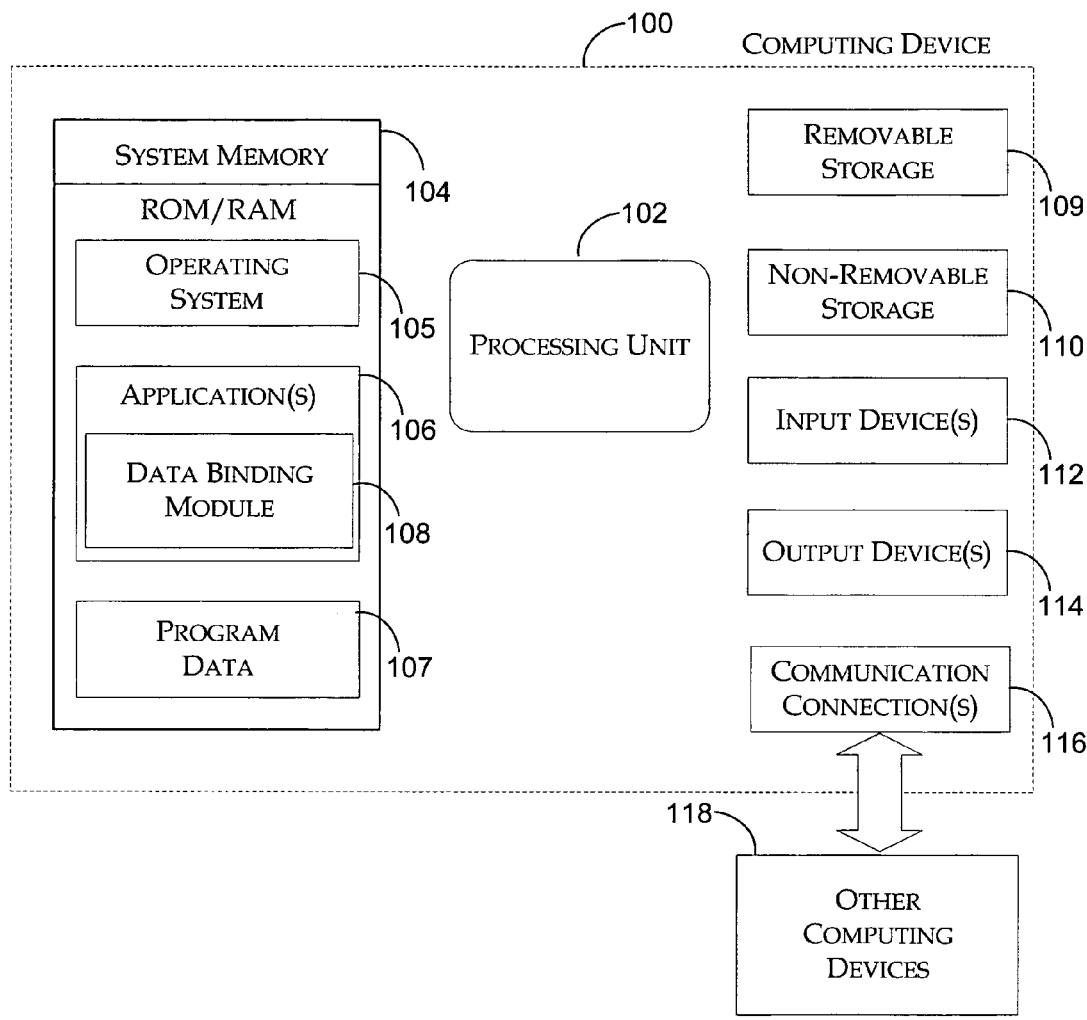
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A data binding module 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Data Binding a Control of a Template

Figure 2A:
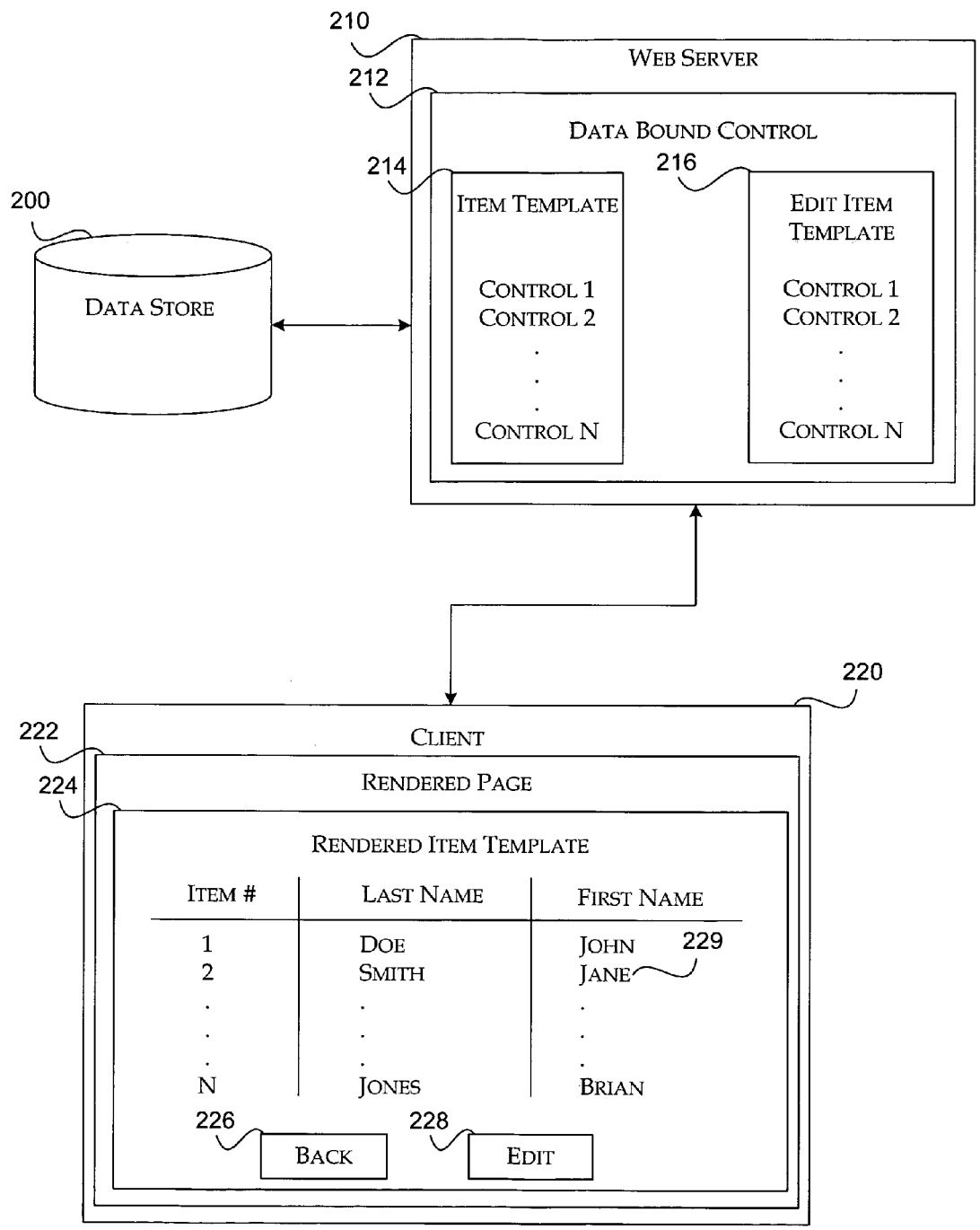
FIG. 2a illustrates a block diagram of a system for data binding a control of a template, in accordance with at least one feature of the present invention.
Figure 2B:
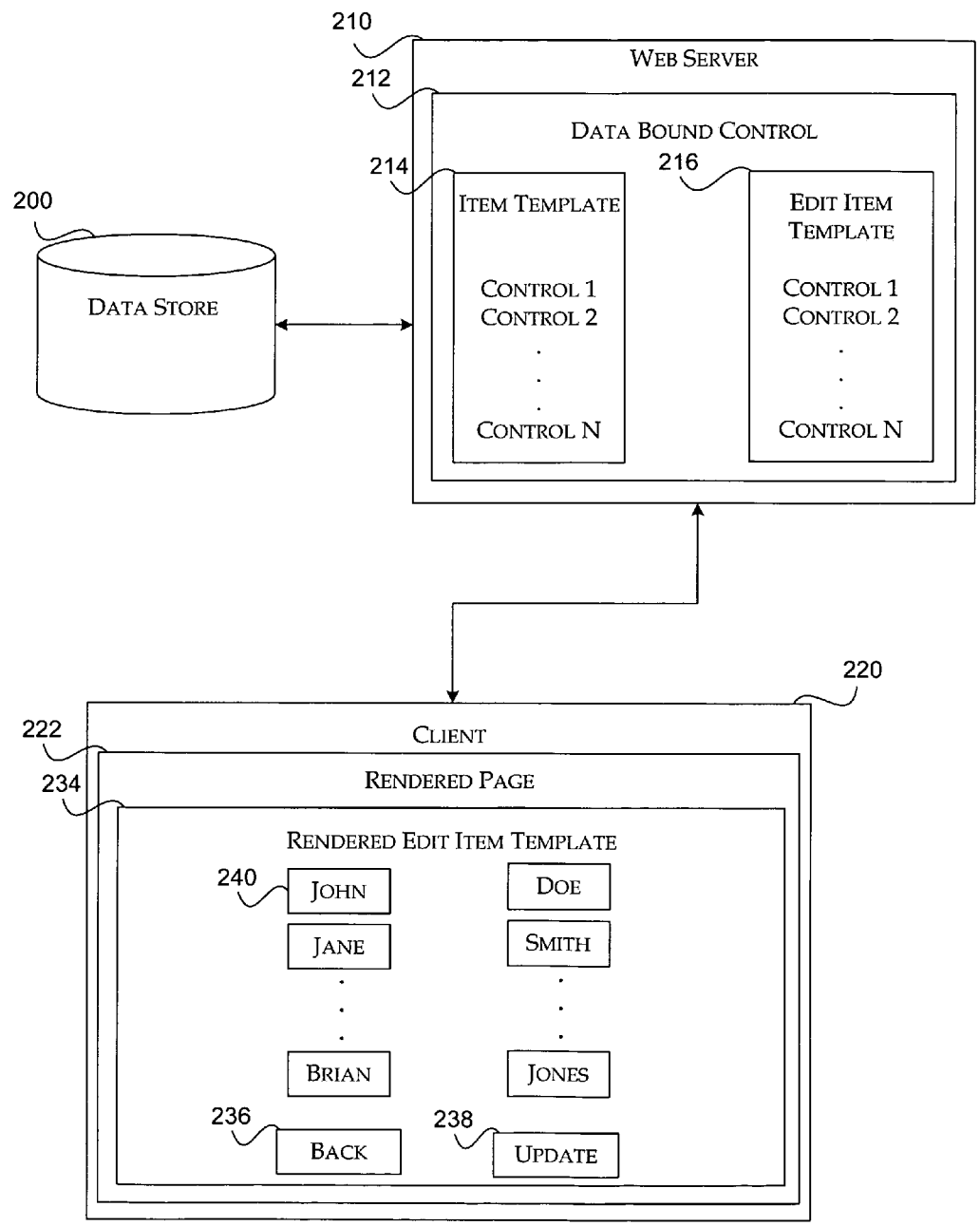
FIG. 2b illustrates a block diagram of a system for data binding a control of a template, in accordance with at least one feature of the present invention.

FIGS. 2a and 2b illustrate block diagrams of a system for data binding a control of a template. The system includes data store 200, web server 210, and client 220. Data store 200 and client 220 are coupled to web server 210. It is understood that data store 200, web server 210, and client 220 may be separate components, or any combination thereof may be combined within one component. In one embodiment, web server 210 and client 230 are implemented in an active server page (ASP) technology paradigm such as that provided by ASP.NET which is developed by the Microsoft Corporation of Redmond, Wash.

Web server 210 includes data bound control 212. Controls may be used to present information on rendered page 224. Example types of controls include textboxes, checkboxes, radio buttons, and menus. Each control is associated with a property that identifies the type of control. Controls may be arranged hierarchically in a control tree. A control may be populated with a value when page 224 is requested and rendered by client 220. This process is commonly referred to as data binding.

Data bound control 212 includes item template 214 and edit item template 216. Templates are commonly used in spreadsheet, database, web page and other applications. Client 220 includes rendered page 222. In one embodiment, as shown in FIG. 2a, rendered page 222 includes rendered item template 224. Rendered item template 224 includes buttons 226, 228. In another embodiment, as shown in FIG. 2b, rendered page 222 includes rendered edit item template 234. Rendered edit item template 234 includes buttons 236, 238.

Client 220 may request a page from web server 210. Server 210 calls the function InstantiateIn on item template 214 to create the controls inside the item template, and then data binds the item template controls to data from data store 200. Every time a page is rendered the control is instantiated by calling InstantiateIn. The retrieved data is populated in the controls on item template 214. Rendered item template 224 is then displayed on rendered page 224 at client 220. Rendered item template 224 includes labels 229.

A user at client 220 may want to modify the data displayed on rendered item template 224. The user may select edit button 228 to initiate an edit process. A post back occurs to web server 210 whenever a page is sent back to web server 210. Control 212 calls InstantiateIn on edit item template 216. The property values of controls inside the bindable template EditItemTemplate of the data bound control FormView are bound to fields in the data item offered by FormView using the following code:

```
<FormView>
    <EditItemTemplate>
        <asp:textbox runat=server text='<%#Bind("field1")%>' \>
        <asp:checkbox runat=server
            checked='<%#Bind("optout")%>' \>
    <\EditItemTemplate>
<\FormView>
```

In this example, the controls inside the bindable template are identified as a text box and a check box. The data item fields are associated with control property values (e.g., "text" and "checked"). The expression between the data binding markers (e.g., "<%#" and "%>") is defined as a data bind block. The data bind block creates a data binding between the control property value "text" and the field "field1" in data store 200. A data binding is also created between the control property value "checked" and the field "optout" in data store 200. This process is referred to as a bidirectional data binding process because the values of the textbox and the checkbox data can be both populated and later retrieved. Appendix A shows an exemplary updateable form and demonstrates different Bind syntaxes.

The data bound control allows for bidirectional data binding such that the controls inside the template do not require built-in data binding logic. The bidirectional data binding process permits the generation of code so that the code is operable with any control property value that may be edited or set. Bidirectional data binding allows a page developer to specify that a field corresponding to a data item in data store 200 is inserted into a control property value when a page is rendered at client 220. Bidirectional data binding also allows the page developer to extract a modified value from edit item template 216 when the control property value is updated and the page is posted back to web server 210.

Edit item template 216 is created from data retrieved from data store 200 such that rendered edit item template 234 (FIG. 2b) may be displayed at client 220. Rendered edit item template 234 is populated with the data retrieved from data store 200. Current or default values of the control properties are displayed as editable data on rendered edit item template 234. For example, current values of names are displayed in textboxes 240. The user may then edit any of the editable data and then click update button 238.

Another post back to web server 210 is triggered in response to the update. Control 212 calls ExtractValues on edit item template 216 to extract the modified values from edit item template 216 when the update process is initiated. The bidirectional data binding allows the modified values to be automatically and codelessly extracted from edit item template 216. ExtractValues pulls the modified values from the control properties and receives a dictionary.

Control 212 fires an update event with the dictionary of values such that the page programmer may determine whether the modified data is in a correct format. For example, the page programmer may reject the modified values if a value has been left blank by the user. In one embodiment, a data transformer may be used to change the format of the modified data. For example, a template field type may be established as numeric, but the value that is extracted from the edit item template may be formatted as text. Thus, the data transformer changes the format of the data from text to a numeric value. An inverse transform may be applied to convert the value back to text when the value is saved in the data store. Many different types of data transformers exist. For example, a data transformer may be used to calculate currency exchange rates, date formats, metric conversions, etc.

Format strings may also be used to change the format of a control property value. In one embodiment, format strings are useful for localizing strings to account for variations in formatting requirements.

Bind('fieldname', 'abc{0}def')

In this bind statement, if "xyz" is the value of the "fieldname" field in the current data binding context, the format string "abc {0}def" may be applied to the field value such that the "{0}" is replaced with "xyz" resulting in the value "abcxyzdef" for the string. "abcxyzdef" is then populated into the corresponding control property value associated with the identified field in the data source (i.e., fieldname). The "xyz" value may also be extracted from the field such that "xyz" is separated from the remainder of the formatted string for storage.

Control 212 calls Update on data store 200 with the dictionary to provide the modified data to data store 200. The dictionary includes a set of keys and values including the updated values as shown below.

Update(IOrderedDictionary dictionary)
   dictionary: "field 1", "fieldVal1×"
   dictionary: "optout", False
where "field1" and "optout" are keys, and "fieldVal1×" and False are the new updated values.

Control 212 renders the page with the new values at client 200 by calling InstantiateIn on item template 214. The new values are shown as labels on item template 214.

Bidirectional data binding may also apply to a non-compiled code page. A non-compiled code page is one that has a page lifecycle that does not emit or compile code. The non-compiled code page is executed via runtime properties. A control property value on the non-compiled code page may be retrieved via reflection rather than from generated code.

Default values may be bound to a field when the value of a field is null (e.g., the value of the field is not in the data source). In one embodiment, a user may insert a new value into a field. However, the field may not be populated with a value before the insertion occurs. Thus, the field may be populated with a default value. For example, a field that is formatted for a date may be populated with a value that corresponds with the current date. In another example, a numeric field may be populated with a zero default value.

Another example of a control that takes advantage of bidirectional data binding is a state storage control. Controls commonly need to keep track of their current state across post backs. A control can add a hidden field to its control tree and bind the hidden field's text property to a data item containing control state using bidirectional data binding. When the page is posted back to the server, the control can use bidirectional data binding to automatically retrieve the stored state from the hidden field's text property and rehydrate the control with state from the original post. In this example of an application of the bidirectional data binding technology, the user does not change anything on the page when the page is posted to the server. Instead the controls inside the template serve as storage for state data that is needed on post back.

Because user-defined templates are a common element of data bound controls, it is desirable to allow a data bound control developer to define a template such that it allows for bidirectional data binding. An IBindableTemplate can be specified by a control developer by adding an attribute onto an ITemplate. This straightforward method for declaring a template that supports bidirectional data binding enables all control developers to take advantage of bidirectional data binding in a uniform way. Appendix B includes exemplary interface definitions for ITemplate and IBindableTemplate. Appendix C includes an exemplary data bound control declaration for ITemplate and IBindableTemplate.

All controls inside a bindable template can participate in bidirectional data binding without any changes to the existing control. Furthermore, page developers can specify a property on a control inside a template to be bidirectionally-bound using simple and familiar declarative syntax.

Figure 3:
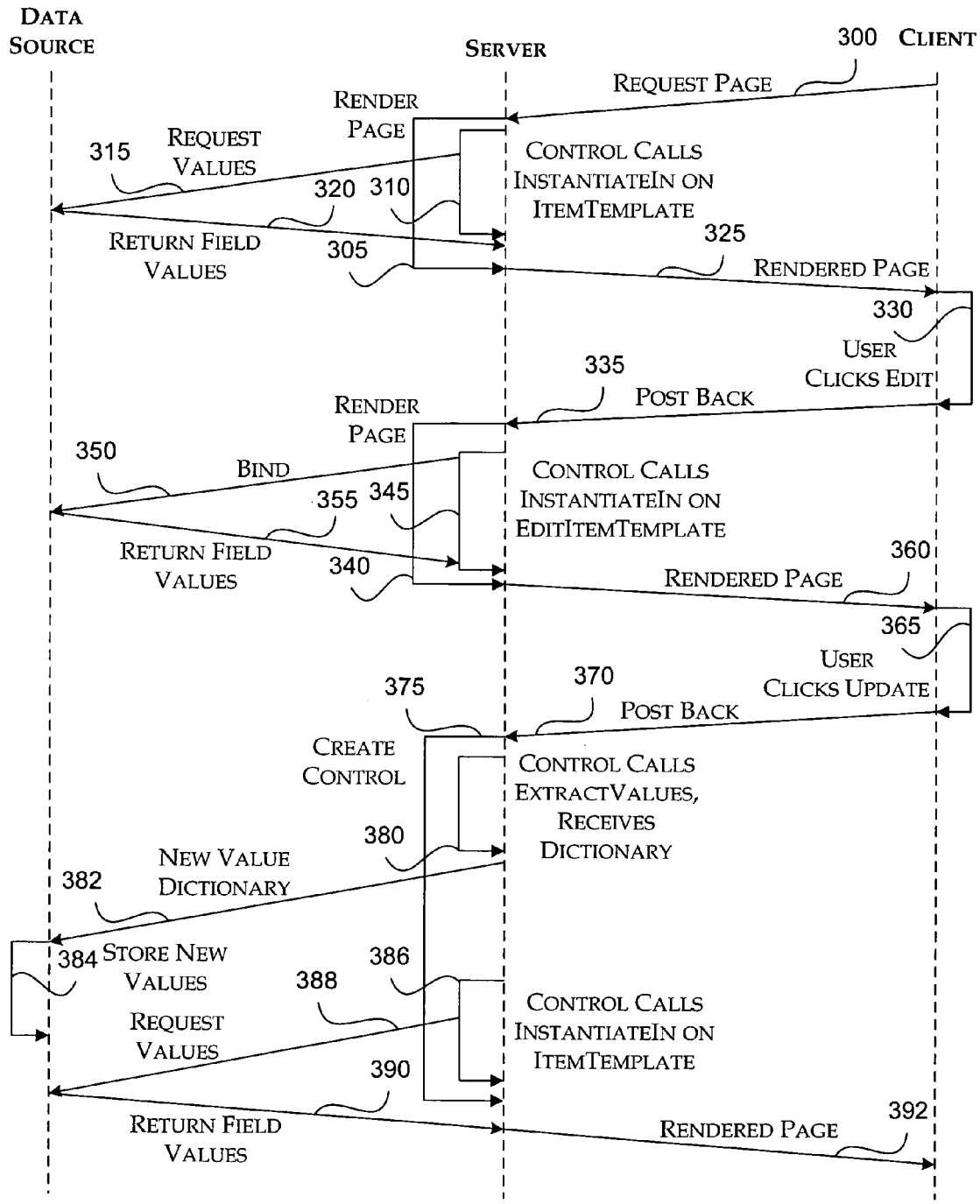
FIG. 3 illustrates an timing diagram illustrating a process for data binding a control of a template, in accordance with at least one feature of the present invention.

FIG. 3 illustrates an timing diagram illustrating a process for data binding a control of a template. The timing diagram shows how the data source, the server and the client interact over time. The process begins at step 300 when the client requests a page from the server. The server renders the read-only page at step 305. The control calls InstantiateIn on the item template at step 310. The server requests field values from the data source at step 315. The field values correspond to fields of the data item in the data source. The field values are sent from the data source to the server at step 320. The rendered page is then forwarded and displayed on the client at step 325. The rendered page is displayed as a read-only document with the retrieved data shown as labels corresponding to the control property values.

The user then clicks an edit button on the user interface of the client to edit the control property values of the template at step 330. A post back to the server occurs at step 335. The server renders the page at step 340. In order to render the page, the control calls InstantiateIn on the edit item template at step 345. The control property values on the edit item template are bound to the fields in the data source at step 350 to facilitate an update process. The bidirectional bind process allows modified control property values to be extracted after being updated by a user and posted back to the server. The field values are retrieved from the data source to create the edit item template at step 355. The rendered page is displayed on the client with the edit item template at step 360. The rendered edit item template includes current or default values of the control properties. The rendered page also indicates which control property values may be edited by the user. For example, the editable values may be displayed as text boxes, check boxes, drop down menus, or any other mechanism for receiving user input.

The user may modify values by typing text in the text box, deselecting a check box, selecting a menu item, etc. The user then clicks an update button on a user interface at step 365. A post back to the server occurs at step 370 in response to the update to automatically and codelessly extract the newly modified values from the edit item template. The control is created with the current control property values on the server at step 375. The control calls ExtractValues on the edit item template (i.e., IBindableTemplate) and receives a dictionary of new values at step 380. The control forwards the new value dictionary to the data source at step 382. The dictionary includes the field names corresponding to the modified control property values such that the data store may locate the associated data items. The data source then stores the new values for the data items at step 384. In one embodiment, the new values are presented to the page programmer to determine whether the new values are acceptable. For example, the page programmer may only accept values that correspond to metric measurements.

The control calls InstantiateIn on the item template at step 386. The current data is requested from the data source at step 388. The requested field values are returned at step 390. The page is rendered on the client as a read-only page with labels corresponding to the current data at step 392.

Figure 4:
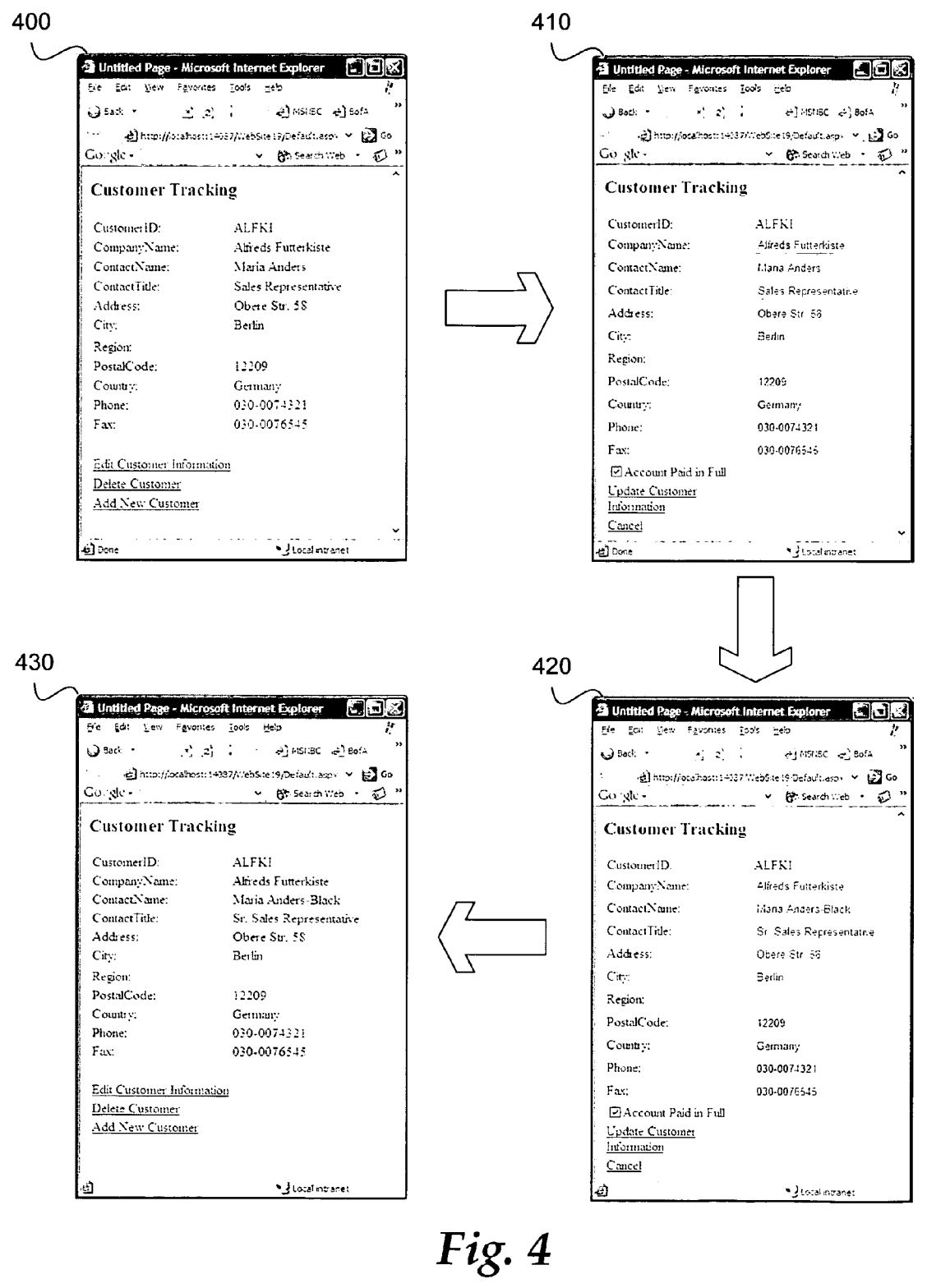

FIG. 4 illustrates several screen shots illustrating a user interface for data binding a control of a template. Screen shot 400 is presented to the user as the original rendered page from the item template. The rendered page is read-only and shows the current control property values as labels. Screen shot 410 is presented to the user when the user clicks "Edit Customer Information". The page is rendered such that any editable values are presented to the user. For example, the editable text is shown within a textbox. The user modifies some of the control property values on shown in screen shot 420. The user then selects "Update Customer Information." The control returns to read-only mode with the updated values included as labels as shown in screen shot 430.

Figure 5:
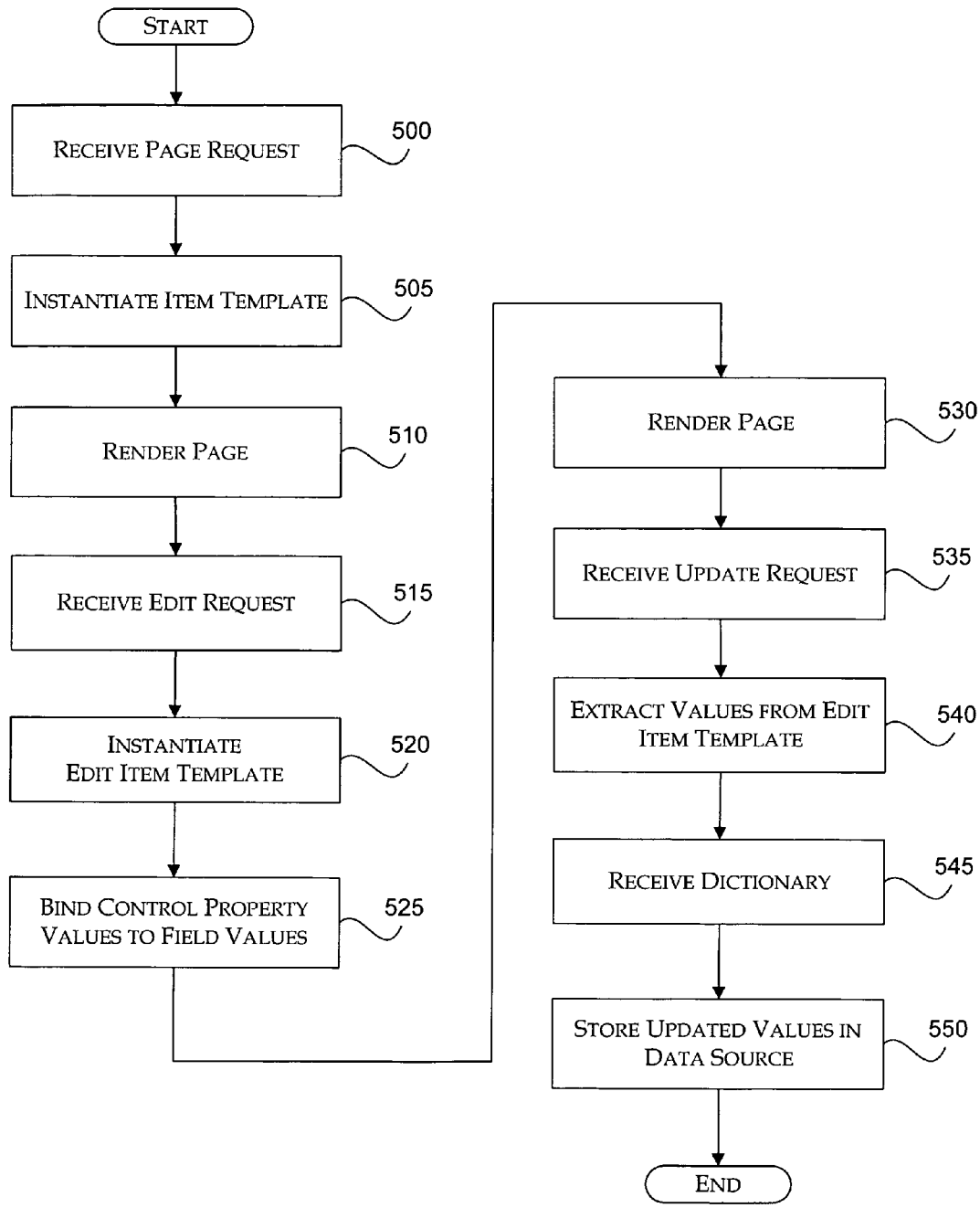
FIG. 5 illustrates an operational flow diagram illustrating a process for data binding a control of a template, in accordance with at least one feature of the present invention.

FIG. 5 illustrates an operational flow diagram illustrating a process for data binding a control of a template. The process begins at a start block where a user requests a page from a client. The page request is received at the server at block 500.

Proceeding to block 505, the control calls InstantiateIn to instantiate the item template. Field values are retrieved from a data store to populate the control. Advancing to block 510, the page is rendered on the client. The rendered page includes the populated item template. The item template is displayed as read-only such that the control property values are shown as labels.

Transitioning to block 515, the user requests the edit to modify the control property values on the page by selecting an edit request on the rendered page and the request is received at the server as a post back. Continuing to block 520, the control calls InstantiateIn to instantiate the edit item template.

Moving to block 525, the control property values in the edit item template are bound to the corresponding field values in the data source. The bidirectional bind process allows modified control property values to be extracted from the edit item template after the values are updated. Proceeding to block 530, the page is rendered at the client as a read/write document such that the control property values are displayed as values that may by edited by the user. The control property values are displayed as current or default values.

Advancing to block 535, the user edits the control property values on the edit item template and then selects an update request that is received at the server as a post back. Transitioning to block 540, the control automatically and codelessly extracts the modified values from the edit item template. Continuing to block 545, the control receives a dictionary of the new values and forwards the dictionary to the data source. The dictionary includes the field names corresponding to the modified control property values. Thus, the data source may locate the associated data items. Moving to block 550, the updated values in the dictionary are stored in the data source. Processing then terminates at an end block.

The above specification, examples and data provide a complete description of the manufacture and use of the composition of the invention. Since many embodiments of the invention can be made without departing from the spirit and scope of the invention, the invention resides in the claims hereinafter appended.

Appendix A

Exemplary Updateable Form and Bind Syntax

```
<%@ Page Language="C#" AutoEventWireup="true" CodeFile="Default.aspx.cs"
Inherits="_Default" %>
<!DOCTYPE html PUBLIC "-//W3C//DTD XHTML 1.1//EN"
"http://www.w3.org/TR/xhtml11/DTD/xhtml11.dtd">
<html xmlns="http://www.w3.org/1999/xhtml" >
<head runat="server">
    <title>Untitled Page</title>
</head>
<body>
    <form id="form1" runat="server">
    <div>
         </div>
        <asp:FormView DataKeyNames="au_id" DataSourceID="DataSource1"
ID="FormView1" runat="server">
            <EditItemTemplate>
                au_id:
                <asp:Label ID="au_idLabel1" runat="server" Text='<%# Eval("au_id")
%>'></asp:Label><br />
                au_lname:
                <asp:TextBox ID="au_lnameTextBox" runat="server" Text='<%#
Bind("au_lname") %>'>
                </asp:TextBox><br />
                au_fname:
                <asp:TextBox ID="au_fnameTextBox" runat="server" Text='<%#
Bind("au_fname") %>'>
                </asp:TextBox><br />
                phone:
                <asp:TextBox ID="phoneTextBox" runat="server" Text='<%# Bind("phone",
"(###) ###-####") %>'></asp:TextBox><br />
                address:
                <asp:TextBox ID="addressTextBox" runat="server" Text='<%#
Bind("address") %>'>
                </asp:TextBox><br />
                city:
                <asp:TextBox ID="cityTextBox" runat="server" Text='<%# Bind("city") %>'>
```

-continued

```
            </asp:TextBox><br />
            state:
            <asp:TextBox ID="stateTextBox" runat="server" Text='<%# Bind("state",
"{0}-US") %>'></asp:TextBox><br />
            zip:
            <asp:TextBox ID="zipTextBox" runat="server" Text='<%# Bind("zip",
"#####") %>'></asp:TextBox><br />
            contract:
            <asp:CheckBox Checked='<%# Bind("contract") %>' ID="contractCheckBox"
runat="server" /><br />
            <asp:LinkButton CausesValidation="True" CommandName="Update"
ID="UpdateButton" runat="server"
                Text="Update">
            </asp:LinkButton>
            <asp:LinkButton CausesValidation="False" CommandName="Cancel"
ID="UpdateCancelButton"
                runat="server" Text="Cancel">
            </asp:LinkButton>
        </EditItemTemplate>
        <ItemTemplate>
            au_id:
            <asp:Label ID="au_idLabel" runat="server" Text='<%# Eval("au_id")
%>'></asp:Label><br />
            au_lname:
            <asp:Label ID="au_lnameLabel" runat="server" Text='<%# Eval("au_lname")
%>'></asp:Label><br />
            au_fname:
            <asp:Label ID="au_fnameLabel" runat="server" Text='<%# Eval("au_fname")
%>'></asp:Label><br />
            phone:
            <asp:Label ID="phoneLabel" runat="server" Text='<%# Eval("phone")
%>'></asp:Label><br />
            address:
            <asp:Label ID="addressLabel" runat="server" Text='<%# Eval("address")
%>'></asp:Label><br />
            city:
            <asp:Label ID="cityLabel" runat="server" Text='<%# Eval("city")
%>'></asp:Label><br />
            state:
            <asp:Label ID="stateLabel" runat="server" Text='<%# Eval("state")
%>'></asp:Label><br />
            zip:
            <asp:Label ID="zipLabel" runat="server" Text='<%# Eval("zip")
%>'></asp:Label><br />
            contract:
            <asp:CheckBox Checked='<%# Eval("contract") %>' Enabled="false"
ID="contractLabel"
                runat="server" /><br />
            <asp:LinkButton CausesValidation="False" CommandName="Edit"
ID="EditButton" runat="server"
                Text="Edit">
            </asp:LinkButton>
            <asp:LinkButton CausesValidation="False" CommandName="Delete"
ID="DeleteButton" runat="server"
                Text="Delete">
            </asp:LinkButton>
            <asp:LinkButton CausesValidation="False" CommandName="New"
ID="NewButton" runat="server"
                Text="New">
            </asp:LinkButton>
        </ItemTemplate>
    </asp:FormView>
  </form>
</body>
</html>
```

Appendix B

Exemplary Interface Definitions for ITemplate and IBindableTemplate

```
public interface IBindableTemplate : ITemplate {
    /// Retrives the values of all control properties
    with two-way bindings.
    IOrderedDictionary ExtractValues(Control container);
}
public interface ITemplate {
    /// Iteratively populates a provided System.Web.UI.ControlCollection
    /// Control with a sub-hierarchy of child controls represented
    by the template.
    void InstantiateIn(Control container);
}
```

Appendix C

Exemplary Data Bound Control Declaration for ITemplate and IBindable Template

```
Declaration of an ITemplate:
    public virtual ITemplate ItemTemplate {
        get {
            return _itemTemplate;
        }
        set {
            _itemTemplate = value;
        }
    }
Declaration of an IBindableTemplate:
    [TemplateContainer(typeof(FormView), BindingDirection.TwoWay)]
    public virtual ITemplate EditItemTemplate {
        get {
            return _editItemTemplate;
        }
        set {
            _editItemTemplate = value;
        }
    }
```

What is claimed is:

1. A computer-implemented method for data binding a control of a template, wherein the template is associated with a parent control that offers a data binding context, the method comprising:
   instantiating the template, wherein the template comprises at least one control property value associated with the control of the template;
   binding, within the template, the at least one control property value to a field of a data item located in a data source, wherein the data item is exposed by the parent control, wherein the parent control includes a declared bidirectional attribute that provides uniform bidirectional data binding for the control of the template, wherein the parent control includes a binding declaration that declares the control of the template, declares the at least one control property value, and binds the at least one control property value to the field of the data item located in the data source by declaring the field within the binding declaration;
   rendering the template on a page for a client, wherein the rendered template comprises the at least one control property value corresponding to the field of the data item;
   receiving at least one modified control property value to the control of the template; and
   automatically and codelessly extracting the at least one modified control property value to from the template by accessing the parent control to bind the modified control property value to the field of the data item according to the binding declaration.

2. The computer-implemented method of claim 1, further comprising:
   receiving a request for a page from the client, wherein the page comprises an item template associated with the parent control;
   instantiating the item template to retrieve data from the data source;
   populating a control on the item template with the retrieved data, wherein the retrieved data is associated with a bidirectional bindable control from the template; and
   rendering the page as a read-only document on the client, wherein the rendered page includes the populated control.

3. The computer-implemented method of claim 1, wherein the template is an edit item template.

4. The computer-implemented method of claim 1, wherein rendering the template further comprises:
   automatically retrieving data corresponding to the field of the data item;
   populating the at least one control property value with the retrieved data, wherein the retrieved data corresponds to at least one of: a current value and a default value; and
   displaying the at least one control property value as editable.

5. The computer-implemented method of claim 1, further comprising modifying the control property value by posting the at least one control property value back to the server in response to an update command.

6. The computer-implemented method of claim 1, further comprising storing the updated control property value in the data source by:
   receiving a dictionary, wherein the dictionary comprises the modified control property value and the corresponding field name of the data item; and
   providing the dictionary to the data source.

7. computer-implemented method of claim 1, further comprising:
   determining whether the at least one modified control property value is correctly formatted; and
   transforming the at least one modified control property value into a correct format when the modified control property is determined to be incorrectly formatted.

8. The computer-implemented method of claim 1, wherein the at least one control property value is associated with state data.

9. A system for data binding a control of a template, wherein the template is associated with a parent control that offers a binding context, the system comprising:
   a client;
   a data store comprising a data item that is exposed by the parent control, wherein the data item comprises a field; and
   a server coupled to the client and to the data store, wherein the server is arranged to:
      bind at least one control property value of the template to the field of the data item, wherein the at least one control property value is located in the control, wherein the parent control includes a declared bidirectional attribute that provides uniform bidirectional data binding for the control of the template, wherein the parent control includes a binding declaration that declares the control of the template, declares the at least one control property value, and binds the at least one control property value to the field of the data item located in the data source by declaring the field within the binding declaration, render the template on a page for the client, wherein the rendered template comprises the at least one control property value corresponding to the field of the data item, update the at least one control property value, and automatically and codelessly extract the at least one updated control property value from the template by accessing the parent control to bind the updated control property value to the field of the data item according to the binding declaration.

10. The system of claim 9, wherein the server is further arranged to:

receive a request to edit the at least one control property value; and instantiate the template in response to the request.

11. The system of claim 9, wherein the server is further arranged to:

create a dictionary in response to extracting the at least one updated control property value, wherein the dictionary comprises the at least one updated control property value and the corresponding name of the field in the data item; and provide the dictionary to the data store, wherein the updated control property value is saved in the data store.

12. The system of claim 9, wherein the page comprises non-compiled code.

13. The system of claim 9, wherein the server is further arranged to:

receive a request for a page from the client, wherein the page comprises an item template associated with the parent control;

instantiate the item template to retrieve data from the data store;

populate a control on the item template with the retrieved data, wherein the retrieved data is associated with a bidirectional bindable control from the template; and render the page as a read-only document on the client, wherein the rendered page includes the populated control.

14. The system of claim 9, wherein the server is further arranged to render the template by:

automatically retrieving data corresponding to the field of the data item;

populating the at least one control property value with the retrieved data, wherein the retrieved data corresponds to at least one of: a current value and a default value; and displaying the control property value as editable.

15. The system of claim 9, wherein the server is further arranged to update the at least one control property value by receiving the at least one control property value as a post back from the client in response to an update command.

16. The system of claim 9, wherein the template is an edit item template.

17. The system of claim 9, wherein the at least one control property value is state data.

18. A computer-readable storage medium having computer-executable instructions for data binding a control of a template, wherein the template is associated with a parent control that offers a data binding context, comprising:

binding at least one control property value of the template to a field of a data item associated with a data source, wherein the data item is exposed by the parent control, wherein the parent control includes a declared bidirectional attribute that provides uniform bidirectional data binding for the control of the template, wherein the parent control includes a binding declaration that declares the control of the template, declares the at least one control property value, and binds the at least one control property value to the field of the data item located in the data source by declaring the field within the binding declaration;

rendering the template on a page for a client, wherein the rendered template comprises the at least one control property value corresponding to the field of the data item;

modifying the at least one control property value;

automatically and codelessly extracting the at least one modified control property value from the template by accessing the parent control to bind the modified control property value to the field of the data item according to the binding declaration;

receiving a dictionary in response to extracting the at least one modified control property, wherein the dictionary comprises the at least one modified control property value and the corresponding name of the field of the data source; and providing the dictionary to the data source, wherein the at least one modified control property is saved in the data source.

19. The computer-readable storage medium of claim 18, further comprising:

receiving a request to edit the at least one control property value; and instantiating the template in response to the request.

20. The computer-readable storage medium of claim 18, wherein modifying the at least one control property value further comprises posting the at least one control property value back to the server in response to an update command.

* * * * *

UNITED STATES PATENT AND TRADEMARK OFFICE
CERTIFICATE OF CORRECTION

| | | |
|---|---|---|
| PATENT NO. | : 7,379,943 B2 | Page 1 of 1 |
| APPLICATION NO. | : 11/046011 | |
| DATED | : May 27, 2008 | |
| INVENTOR(S) | : Polita Paulus et al. | |

It is certified that error appears in the above-identified patent and that said Letters Patent is hereby corrected as shown below:

In column 14, line 4, in Claim 1, after "value" delete "to".

Signed and Sealed this
Twelfth Day of April, 2011

David J. Kappos
*Director of the United States Patent and Trademark Office*